United States Patent [19]

Peterson

[11] Patent Number: 5,509,049
[45] Date of Patent: Apr. 16, 1996

[54] AUTOMATIC DIALING OF NUMBER RECEIVED FROM DIRECTORY ASSISTANCE FROM WITHIN CELLULAR SYSTEM

[75] Inventor: Bruce M. Peterson, Somonauk, Ill.

[73] Assignee: Voicetech Communications, Inc., Elmhurst, Ill.

[21] Appl. No.: 331,997

[22] Filed: Oct. 31, 1994

[51] Int. Cl.[6] ........................................ H04Q 7/20
[52] U.S. Cl. .................. 379/58; 379/59; 379/212
[58] Field of Search .................. 379/58, 59, 61, 379/355, 213, 212; 455/33.1; 381/41, 42, 43; 395/2.55, 2, 2.1

[56] References Cited

U.S. PATENT DOCUMENTS 4,593,157 6/1986 Usdan .................. 370/355 X
5,276,729 1/1994 Higuchi et al. .................. 379/58
5,297,183 3/1994 Bareis et al. .
5,339,352 8/1994 Armstrong et al. .

Primary Examiner—Curtis Kuntz
Assistant Examiner—Michael B. Chernoff
Attorney, Agent, or Firm—Welsh & Katz, Ltd.

[57] ABSTRACT

A method and apparatus is provided for automatically completing a directory assisted call connection from within a cellular system. The method includes the steps of requesting a telephone number of a communication target by a cellular communication unit from directory assistance and voice recognizing each digit of an audio representation of the telephone number of the communication target returned by directory assistance. The method further includes the step of completing the call connection from the cellular communication unit to the communication target based upon the voice recognized returned number.

10 Claims, 1 Drawing Sheet

AUTOMATIC DIALING OF NUMBER RECEIVED FROM DIRECTORY ASSISTANCE FROM WITHIN CELLULAR SYSTEM

BACKGROUND OF THE INVENTION

The field of this invention relates to cellular communication systems and more particularly to voice recognition systems used within cellular communication systems.

Cellular systems using voice recognition for number dialing are known. One such system was that taught by Bareis et al. in U.S. Pat. No. 5,297,183. Such systems typically rely on a voice recognition system operably interconnected with a cellular switch located at a mobile telephone switching office (MTSO) and, in turn, accessed through the use of a special, voice dial activation sequence (e.g., * # "send").

A memory is typically associated with the voice recognition system. The memory is used to store a speech profile of individual users. The identity of an individual user is transferred to the voice recognition system during call set-up. The identity of the user allows the voice recognition system, by reference to a voice profile of a particular user, to more accurately interpret the spoken words of an individual user.

To use the cellular voice recognition system, a user activates the cellular phone and presses the voice dial sequence. In response, a MTSO operating through a nearby cellular base station allocates a radio frequency (RF) traffic channel between the base station and user. The MTSO also allocates a wireline traffic channel between the MTSO and voice recognition unit.

Upon completion of a voice path between the user and voice recognition unit, the user speaks a key word such as "dial" followed by a sequence of spoken numbers identifying a communication target. The voice recognition system converts the spoken words into digits and formats the digits into a call request to the communication target under an appropriate telephone protocol (e.g., feature group D (fg-d)) understood by the cellular switch of the MTSO. The call request is transferred back to the originating MTSO which, in turn, completes the call.

As an alternative to reciting a sequence of numbers for access to a communication target, a user may store a number sequence under a name such as "home" or "office", or "Bob", or "Mary". The user stores the sequence by first reciting a number sequence followed by the word "store" and a name. Following storage of a name and associated access number, the user simply speaks the word "call" followed by the name. The voice recognition system responds by retrieving the number from memory and transferring a call access request to an originating switch.

Call completion may be accomplished under either of two possible scenarios. Typically, the call is completed directly from the voice recognition system to the communication target, leaving the voice recognition system within the voice path between the cellular caller and communication target. Alternatively, the MTSO could re-route the call path directly from the cellular caller to the communication target.

While voice recognition systems have worked well, the prior art has limited the use of such systems to the subscriber/ cellular system interface at the MTSO. The use of such systems in the automotive context has significantly enhanced the safety of cellular phones used in automobiles by allowing a driver of an automobile to dial without taking his/her eyes off the road. Directory assisted calls have also reduced risks of cellular calls in recent years by allowing automatic call completion through apparatus associated with the directory assistance database.

Directory assistance, on the other hand, is a service that is typically associated with a local public switch telephone network (PSTN). Because directory assistance is located within the PSTN, it is typically the PSTN which completes the call connection of the directory assisted call.

Where a directory assisted call is from a first cellular user to a second party, the directory assisted call is routed through a cellular base station of the first user to a PSTN switch of the directory assistance system, and then to the second party. Calls to directory assistance are typically routed through a switch of the PSTN because the PSTN cannot reroute calls through the cellular system due to differing signalling protocols and also because of a desire on the part of owners of the PSTN to retain the revenue associated with such routing within the PSTN. Further, since the PSTN completes the call connection, the cellular system does not have a call record of such call until such time as the PSTN forwards a bill. When the PSTN forwards a bill for the call, the time use records of the cellular system can be matched with the PSTN line charges and a bill sent to the cellular subscriber. Because of the delay in billing from the PSTN, a cellular subscriber may receive a bill for PSTN line charges a month or more after the cellular subscriber has paid for the cellular air-time associated with the call. Because of the importance of billing efficiency in communication systems, a need exists for a means of automatically routing directory assisted calls from within the cellular system. Such means is important not only from the point of view of timely billing to the subscriber, but also because of a need to maximize revenue within an originating cellular system. The cellular system, as the original service provider, should have the first right of providing customer support services such as call forwarding and automatic call completion.

SUMMARY OF THE INVENTION

It is, therefore, an object of the present invention to describe an implementation of a speech recognition system in a cellular communication network.

It is a further object of the invention to describe a method of automatically connecting directory assisted calls from within a cellular system using a voice recognition system. The use of a voice recognition system may significantly increase communication system billing efficiency.

It is a further object of the invention to describe a menu based system for automatically completing calls which reduces call completion time by presenting a menu of options to a caller at the same time as a telephone number of a communication target is returned to automatic call completion circuitry within the cellular system.

These and other objects are provided in a method and apparatus of automatically completing directory assisted call connections from within a cellular system. The method includes the steps of requesting a telephone number of a communication target by a cellular communication unit from directory assistance and voice recognizing each digit of an audio representation of the telephone number of the communication target returned by directory assistance. The method further includes the step of completing the call connection from the cellular communication unit to the communication target based upon the voice recognized returned number.

DESCRIPTION OF THE DRAWINGS

The features of the present invention which are believed to be novel are set forth with particularity in the appended claims. The invention itself, however, together with further objects and advantages thereof may best be understood with reference to the following description when taken in conjunction with the accompanying drawings in which:

DETAILED DESCRIPTION OF A PREFERRED EMBODIMENT

The solution to the problem of being able to route directory assisted calls from within a cellular system lies, conceptually, in using a voice recognition system of a cellular system as a means of voice recognizing and capturing the digits of a requested number, and as a means of terminating a connection with the PSTN upon receiving those digits. A controller of the cellular system monitors each call request for the number sequences associated with directory assistance (i.e., 411 or 555-1212). Upon detecting such a call the controller adds the voice recognition system to the call connection and uses the voice recognition system to monitor for indicia of the requested number. The indicia of the requested number is not a part of the requested number itself but rather is an indication that the requested number is about to be recited. The indicia may be a tone or it may be simply the words "the number is". Using the voice recognition system to monitor for indicia of the number rather than the number itself prevents the voice recognition system from becoming confused by other recited numbers such as an address of the requested party.

Upon hearing, and identifying the appropriate digits of the communication target by the voice recognition unit, a local controller within the voice recognition unit interrupts the connection with the PSTN and presents the user (via a voice recording) with an option for automatic call completion. One option may be that the cellular user speaks the word "yes" (or presses the button labeled "1" on the cellular phone) and the call is automatically routed by the local cellular system. Another option is that the caller simply hangs-up and dials the number directly.

Figure 1:
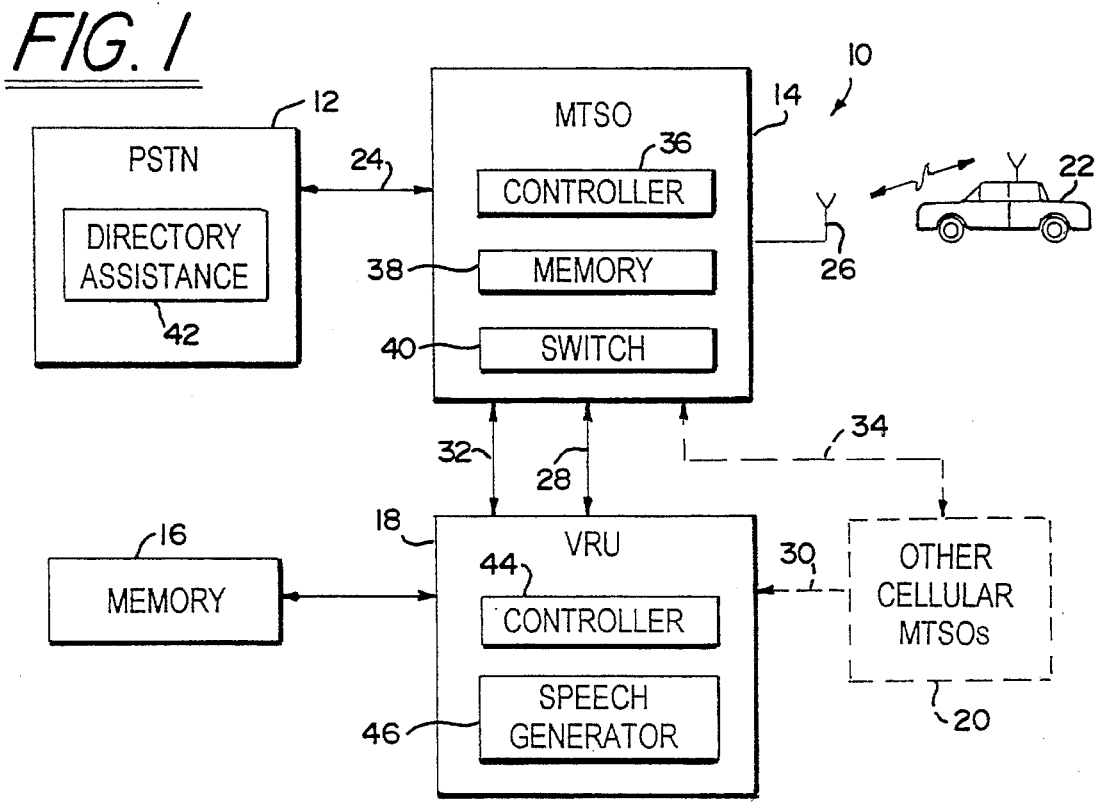
FIG. 1 is a block diagram of a cellular communication system and voice recognition unit in accordance with an embodiment of the invention.

FIG. 1 is a block diagram of the infrastructure of a wide area communication system which includes a cellular communication system 10 in accordance with an embodiment of the invention. Included within the cellular system 10 is a MTSO 14, a voice recognition unit (VRU) 18, and a memory unit 16. The MTSO 14 may provide control and switching for a single cellular base station 26 as shown in FIG. 1 or provide switching and control for a number of base stations 26.

The MTSO 14 acts to receive and route calls from a mobile communication unit 22 to a communication target (not shown) within the cellular communication system 10 or within the PSTN 12. Likewise, the system 10 may route a call from the PSTN to the communication unit 22.

To initiate a call, a user (not shown) of a communication unit 22 enters a number sequence (telephone number) of a communication target and presses a send button. A controller (not shown) of the communication unit 22 composes an access request based, inter alia, upon the communication target telephone number and a mobile identification number (MIN) of the communication unit 22. The communication unit 22 scans for an appropriate RF access channel of the system 10 and transmits the access request to a nearby base station 26 of the cellular communication system 10.

The base station 26, upon receiving the access request, transfers the request to the MTSO 14 for processing. Within a controller 36 of the MTSO 14, the MIN of the communication unit 22 is recovered from the access request and compared with a list of other MIN numbers in a database 38 to determine if the communication unit 22 is authorized to operate within the communication system 10.

If the controller 36 determines that the communication unit 22 is authorized to operate within the cellular system 10, the MTSO 14 grants system access to the communication unit 22. The MTSO 14 notifies the communication unit 22 of such grant by transmitting a channel grant to the communication unit 22 identifying an RF channel to be used by the communication unit 22. The channel grant may indicate that the RF channel upon which the access grant was transmitted is to become a traffic channel or that another identified RF channel is to be used as a traffic channel.

Concurrent with the access grant, the MTSO 14 also establishes a wireline traffic channel between the switch 14 and communication target (e.g., within the PSTN 12). The controller 36 of the MTSO 14 determines how to create the traffic channel between the switch 14 and communication target by reference to a routing table within a database 38 of the cellular control 36.

The MTSO 14 of the cellular system 10 is interconnected with other communication systems (e.g., PSTN 12, other cellular switches 20) through a number of trunk groups 24, 34 (e.g., T1 lines). Each trunk group of trunk groups 24, 34 is associated with a specific geographic area. The specific geographic area of each trunk group 24, 34 is stored in a routing table within memory 38 along with indicia of telephone numbers associated with each geographic area. In routing a call from a communication unit 22 to a communication target, the controller 36 simply compares the telephone number of the communication target with the indicia of geographic location within memory and selects a trunk channel of the trunk group associated with the geographic location as a traffic channel. Upon selecting the proper trunk group, the controller 36 of the MTSO 14 transmits a call request using either in-band or out-of-band signalling.

If the communication target is determined to be a cellular phone serviced by another cellular MTSO 20, then the controller 36 selects a trunk group 34 interconnected with the other cellular MTSO 20 and may transmit a call request to the other MTSO 20 by selecting a trunk channel of the trunk group 34 and using an appropriate in-band signalling protocol (e.g., automatic number identification (ANI) or channel associated signalling (CAS)). Upon receiving a favorable reply, the controller 36 instructs the switch 40 to provide a signalling path between the traffic channel allocated to the communication unit 22 and the selected trunk channel.

If the communication target is determined to be within the PSTN, then the controller may transmit a call request also using an in-band signalling (e.g., pulse coded modulation (PCM)) on a selected trunk channel of the appropriate trunk groups 24 to the PSTN. Upon agreement between the PSTN 12 and MTSO 14 as to the identity of a trunk channel, the controller 36 instructs the switch to interconnect the identified trunk channel with the traffic channel allocated to the communication unit 22.

Under an embodiment of the invention, and to retain control of directory assistance calls, a call from a communication unit 22 that identifies the directory assistance 42 of the PSTN 12 as a communication target is routed, first through the VRU 18, and then to directory assistance 42. Under the embodiment, the VRU 18 provides the functions of number recovery from directory assistance 42, menu presentation, and call forwarding based upon the number recovered from directory assistance 42.

Under the embodiment, the initial call transfer to the VRU 18 may occur under either of two possible scenarios. Under the first scenario, the communication unit 22 may dial 411 or 555-1212. The MTSO 14, upon receipt of the call request, refers the number to a communication unit routing table within memory 38 for determination of a proper trunk group for calls received directly from communication units 22. Under the embodiment, the memory 38 indicates that directory assistance calls are to be routed through the VRU 18 and identifies a trunk group 28, associated with the VRU 18, as being the proper trunk group for directory assisted calls from communication units 22. The controller 36, in turn, composes a call request under an appropriate protocol (e.g., ANI, CAS) requesting access to directory assistance 42 of the PSTN 12 through the VRU 18.

Under the second scenario, where a cellular communication unit 22 has voice dialing, an operator enters a voice dialing sequence (e.g., *#). The MTSO 14, by reference to memory 38, refers the call to the VRU 18. The communication unit 22 dials by saying the words "directory assistance" or "4-1-1" or "5-5-5-1-2-1-2".

A controller 44 within the VRU 18 upon receiving the call request, in turn, refers to its own routing table within memory 16 for a proper trunk group. The memory 16 identifies trunk group 32 as the proper trunk group. The controller 44 of the VRU 18 now repeats the call request (requesting access to directory assistance 42 of the PSTN 12), under an appropriate protocol, back to the MTSO 14. The VRU 18, also by reference to memory 16, recognizes that this is a call for directory assistance and that the VRU 18 is to retain a controlling function in the capture and re-dialing of returned digits. Accordingly, a flag is set in the controller 44 to monitor for the digits of the communication target returned from directory assistance.

Since the incoming call request from the VRU 18 to the MTSO 14 is in the format of an intra-MTSO call request, the controller 36 of the MTSO 14, by reference to memory 38, now identifies a different trunk group 24 as being the proper trunk group. Also by reference to memory 38, the controller 36 may determine that the call request may have to be re-formatted into a protocol used by the PSTN (e.g., PCM). Accordingly, the controller 36 composes a call request, under the PCM format, selects a trunk channel in the trunk groups 24 and transmits the call request.

Upon receipt of the call request by the PSTN, the PSTN completes the call connection to the directory assistance 42 and goes off-hook on the selected trunk channel of the PSTN trunk group 24. The controller 36 of the MTSO 14, upon detecting the off-hook condition directs the switch 40 to provide an interconnection between the selected trunk channels of trunk groups 24 and 32. Likewise, the VRU 18 internally interconnects the selected traffic channels of trunk groups 32 and 28. At the same time, the VRU 18 also begins monitoring the traffic channel for a returned number of the communication target from directory assistance 42.

Upon completion of the duplex connection between the directory assistance 42 and communication unit 22, a directory assistance operator inquires as to the city of the communication target, at which time the user of the communication unit 22 responds with the name of a city and a name of the communication target. The VRU 18 does not react to the initial exchange between the directory assistance operator and operator of the communication unit 22 because the VRU 18 is still looking for specific indicia of the returned number of the communication target. The indicia may be a tone (e.g., the characteristic AT&T tone) or the words "the number is". Following detection of the indicia of the returned number, the VRU 18 begins collecting digits.

Following collection of the last digit of the telephone number of the communication target, the VRU 18 drops the connection with directory assistance 42. Since the VRU 18 now has the telephone number of the communication target, the cellular system can now automatically complete the connection (i.e., by re-routing the call) to the communication target.

Under one embodiment of the invention, an end-to-end voice path is maintained between the communication unit 22 and directory assistance 42 during recitation of the returned digits. The end-to-end connection allows the communication unit 22 to hear the returned number of the communication target. After dropping the connection with directory assistance 42, a speech generator 44 within the VRU 18 offers the communication unit 22 the option of an automatic connection by reciting the words "for an additional charge (e.g., 45¢) an automatic call connection will be made if you press 1 now". Since the user of the communication unit 22 has heard the returned digits from directory assistance 42, he/she may either press 1, or hang up and dial the number directly.

If the user presses the number 1, the VRU 18 composes a call request for transmission to the MTSO 14 using the returned digits as the called number. The MTSO 14 then completes the call as under the prior art with the VRU 18 remaining in the call path.

In another embodiment of the invention and upon detecting the indicia of returned digits from directory assistance, the VRU 18 blocks the voice path between the VRU 18 and communication unit 22 and presents the user of the communication unit 22 with two options. The two options may be presented as follows: "For an additional 45¢ an automatic call connection will be made with the requested party if you press 1 now, or, if you wish to hear the telephone number of the requested party press 2 now" Since the VRU 18 is collecting returned digits during presentation of the menu, the time required to automatically complete a call connection would be reduced by simultaneously presenting a menu while collecting digits of the returned number. If after hearing the menu, the user of the communication unit 22 still wishes to hear the returned digits, and presses 2, the speech generator 46 simply recites the returned digits in proper order. If the user of the communication unit 22 presses 1, the call is completed as described above.

In another embodiment of the invention, the user of the communication unit 22 is not given the option of manually dialing the returned digits. Under the embodiment, the VRU 18 blocks the audio path of the returned digits to the communication unit 22 immediately upon detecting indicia of returned digits. Upon receipt of the last digit, the VRU 18 composes a call request for transmission to the MTSO 14 using the returned digits as the called number. The call request is forwarded to the MTSO 14 which then completes the call. The VRU 18 remains in the voice path during a subsequent call connection In another embodiment of the invention, a VRU 18 and memory 16 is shared by a number of MTSOs (e.g., MTSO 14 and other MTSOs 20). Under the embodiment, the VRU 18 is interconnected with each of the other MTSOs 20 through trunk group 30 that are substantially the same as the trunk connection 28, 30 between the VRU 18 and the MTSO 14.

Where a single cellular system 10 comprises a number of MTSOs (i.e., MTSO 14 and MTSOs 20) having a single trunk group 24 interconnected with the PSTN 12, then automatic completion of directory assisted calls from communication units 22 in the service coverage area of the MTSO 14 would proceed as described above. Calls from other communication units 22 located in service coverage areas of any of the other MTSOs 20 would be routed to the VRU 18 through the interconnected trunk group 30 B and to directory assistance 42 of the PSTN 12 through the local interconnecting MTSO 14. Automatic call completion would also be routed through the local interconnecting MTSO 14.

Where local connections exist between the other MTSOs 20 and the PSTN 12, then the call connection to the directory assistance 42 from the VRU 18 would typically be routed through the VRU 18 and, then, back to a local MTSO of the other MTSOs 20 for a local access to the PSTN 12. Automatic call connection would also be routed from the VRU 18 back through a local MTSO of the other MTSOs 20.

Figure 2:
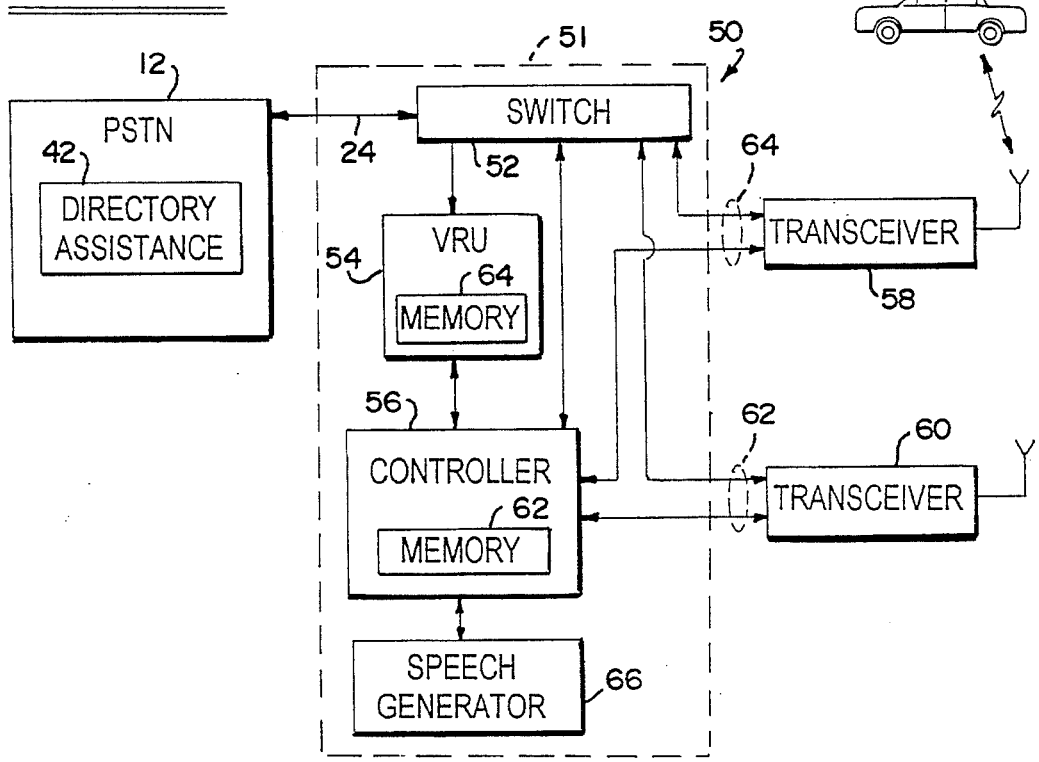
FIG. 2 is a block diagram of an alternative embodiment of a cellular communication system and voice recognition unit in accordance with an embodiment of the invention.

Under another embodiment of the invention, the VRU 18 and memory 16 of FIG. 1 are incorporated into the MTSO 14. FIG. 2 is a block diagram of such an embodiment. Under the embodiment, a MTSO 51 of a cellular communication system 50 may be interconnected with and control a number of remotely located base transceiver stations (BTSs) 58, 60. The interconnection between the MTSO 51 and BTSs 58, 60 may be accomplished using any of a number of protocols (e.g., an integrated services digital network (ISDN) using a basic rate interface (BRI) having 2-B data channels a 1-D control channel or an ISDN interface using the higher capacity T1 lines).

Integrating the VRU 54 into the MTSO 51 reduces the complexity of a cellular system 50 by allowing all traffic channels to be routed through a common switch 52. Integration also allows for the use of a common controller 56 for both call processing and voice recognition control.

It is to be understood that while the VRU 54 and controller 56 are shown as each having separate memory devices 62, 66, that such memory may be commonly located and divided in function only by the software using such memory. It is also to be understood that some distributed processing may be located within the VRU 54 separate and apart from the controller 56.

To gain access to the communication system 50, the communication unit 22 scans for an access channel (e.g., control or traffic) and transmits an access request. Upon receipt, the access request is transferred to the controller 56 for processing.

If the communication unit 22 is registered within the system 50, the controller 56 allocates a traffic channel to the communication unit 22. By reference to memory, the controller 56 instructs the switch 52 to make an appropriate connection with a communication target (e.g., a PSTN subscriber).

Where the trunk groups 24 interconnected with the PSTN 12 is an ISDN interface (e.g., SS7), the controller 56 instructs the switch 52 to route the call request to the PSTN 12 on a control channel of the trunk group associated with the geographic area of the communication target. Upon identification of an available traffic channel based upon the control channel exchange, the controller 56 instructs the switch 52 to establish a signal path between the allocated channel of the communication unit 22 and identified ISDN traffic channel.

Under the embodiment, where the communication unit 22 requests access to directory assistance 42 of the PSTN 12, the controller establishes the signal path to directory assistance as previously described for the communication unit to PSTN subscriber call. The controller 56 identifies the appropriate trunk group 24 by reference to a routing table within memory 62, negotiates a trunk connection, and instructs the switch B2 to complete the connection. In addition, the controller 56, by reference to memory 62, identifies the call as a directory assistance call and instructs the switch 52 to add the VRU 54 to the call connection. At the same time, the controller 56 activates the VRU 54 to monitor for indicia of a returned number.

As the numbers of the communication target are returned from directory assistance, the VRU 54 detects and stores such numbers. Upon transfer of the last digit, the VRU 54 notifies the controller of completion and transfers the returned number of the communication target to the controller 56.

The controller 56 then, through operation of a speech generator 66, presents one of the previously described menus to the operator of the communication unit 22. To complete the automatic connection, the controller 56 drops the directory assistance call connection and re-initiates a call using the returned number. The call request is routed to the PSTN 12 through an appropriate control channel of PSTN trunk group 24. Upon identification of a traffic channel, the controller instructs the switch to connect the allocated channel of the communication unit 22 to the identified trunk channel without further involvement of the VRU As described, the present invention provides a directory assistance call forwarding apparatus which overcomes the deficiencies of the prior art. By re-initiating a call from the source (cellular switch), a call path is optimized in both distance and time of set-up.

While specific embodiments of the present invention have been shown and described herein, further modifications and improvements may be made by those of skill in the art. All such modifications which retain the basic underlying principles disclosed and claimed herein are within the scope of the invention.

What is claimed is:

1. A method of automatically completing a directory assisted call connection from within a cellular system infrastructure comprising the steps of:

requesting a telephone number of a communication target by a cellular communication unit from directory assistance;

voice recognizing each digit of an audio representation of the telephone number of the communication target returned by directory assistance from within a local mobile telephone switching office; and completing the call connection from the cellular communication unit to the communication target based upon the voice recognized returned number by re-routing the call connection from within the mobile telephone switching office.

2. The method as in claim 1 further comprising the step of monitoring for indicia of the returned number.

3. The method as in claim 1 further comprising the step of generating a call request based upon the returned number.

4. The method as in claim 3 further comprising the step of identifying a trunk group of the communication target by comparing the returned number with a routing table within a memory of the cellular system.

5. An apparatus for automatically completing a directory assisted call connection from within a cellular communication system infrastructure comprising:

means located within a local mobile telephone switching office for detecting a call to directory assistance from a cellular communication unit requesting a telephone number of a communication target;

a voice recognition unit located within a local mobile telephone switching office activated by the means for detecting for identifying each digit of an audio representation of the telephone number of the communication target returned by directory assistance;

means located within a local mobile telephone switching office operably interconnected with the voice recognition unit for completing the call connection from the cellular communication unit to the communication target based upon the identified returned digits.

6. The apparatus as in claim 5 further comprising means for detecting indicia of a returned number.

7. The apparatus as in claim 5 further comprising a cellular switch activated by the means for detecting for interconnecting the voice recognition unit to the directory assistance call.

8. The apparatus as in claim 7 wherein the means for completing the call connection further comprises a controller within the voice recognition unit for receiving the identified digits, composing a call request, and communicating the call request to the cellular switch.

9. The apparatus as in claim 5 wherein the means for detecting further comprises a controller means of a mobile telephone switching office for comparing call requests with a routing table.

10. The apparatus as in claim 5 wherein the means for completing the call connection further comprises a controller means within a mobile telephone switching office for comparing the returned number with a routing table and composing a call request based upon the returned number and contents of the routing table.

* * * * *

UNITED STATES PATENT AND TRADEMARK OFFICE
CERTIFICATE OF CORRECTION

PATENT NO. : 5,509,049
DATED : Apr. 16, 1996
INVENTOR(S) : Peterson

It is certified that error appears in the above-indentified patent and that said Letters Patent is hereby corrected as shown below:

On title page, item [56] in "References Cited"
After "Usdan", change "370" to --379--.

Col. 7, line 13, after "30", delete "B".
Col. 8, line 12, change "B2" to --52--.
Col. 8, line 33, after "VRU", insert --54--.

Signed and Sealed this

Twenty-ninth Day of May, 2001

*Attest:*

NICHOLAS P. GODICI

*Attesting Officer*   *Acting Director of the United States Patent and Trademark Office*